United States Patent
Naphad et al.

(10) Patent No.: US 8,597,581 B2
(45) Date of Patent: Dec. 3, 2013

(54) SYSTEM FOR MAINTAINING FLAME STABILITY AND TEMPERATURE IN A CLAUS THERMAL REACTOR

(75) Inventors: Sachin Suhas Naphad, Katy, TX (US); Ganesh Prasadh Kidambi, Dugalur-Nilgiris (IN)

(73) Assignee: General Electric Company, Schenectady, NY (US)

( * ) Notice: Subject to any disclaimer, the term of this patent is extended or adjusted under 35 U.S.C. 154(b) by 517 days.

(21) Appl. No.: 12/652,019

(22) Filed: Jan. 4, 2010

(65) Prior Publication Data
US 2011/0165026 A1    Jul. 7, 2011

(51) Int. Cl.
*B01J 19/00* (2006.01)
*C01B 17/00* (2006.01)

(52) U.S. Cl.
USPC ........ 422/129; 423/563; 423/564; 423/567.1; 423/571; 423/573.1; 423/576.2; 423/576.4; 423/578.1; 423/578.4

(58) Field of Classification Search
USPC .............. 422/129; 423/563, 564, 567.1, 571, 423/573.1, 576.2, 576.4, 578.1, 578.4
See application file for complete search history.

(56) References Cited

U.S. PATENT DOCUMENTS

| | | | |
|---|---|---|---|
| 4,038,036 A * | 7/1977 | Beavon | 422/641 |
| 4,100,266 A * | 7/1978 | Smith | 423/574.1 |
| 4,123,220 A * | 10/1978 | Bond et al. | 431/353 |
| 4,147,485 A * | 4/1979 | Zimmerman | 425/144 |
| 4,632,043 A | 12/1986 | Pendergraft | |
| 4,780,305 A | 10/1988 | Steppe | |
| 5,674,360 A * | 10/1997 | Wyllie | 162/52 |
| 7,300,642 B1 * | 11/2007 | Pedersen et al. | 423/359 |
| 2008/0247927 A1 * | 10/2008 | Rameshni | 423/237 |
| 2008/0260611 A1 * | 10/2008 | Aderhold et al. | 423/224 |
| 2009/0092524 A1 * | 4/2009 | Ravikumar et al. | 422/171 |

FOREIGN PATENT DOCUMENTS

WO    WO 2006/113935 A2 *    10/2006 ............ B01J 10/100

* cited by examiner

*Primary Examiner* — Prem C Singh
*Assistant Examiner* — Huy-Tram Nguyen
(74) *Attorney, Agent, or Firm* — Fletcher Yoder P.C.

(57) ABSTRACT

A system may include a sulfur recovery unit. The sulfur recovery unit may include an acid gas supply, which may supply acid gas, an oxygen supply, which may supply oxygen, a fuel supply, which may supply fuel. The fuel may have a higher heating value than the acid gas. Also, the sulfur recovery unit may include a thermal reaction zone, which may thermally recover sulfur from the acid gas by combustion of the fuel and the acid gas with the oxygen and through reaction of the acid gas with combustion products arising from the combustion.

16 Claims, 4 Drawing Sheets

SYSTEM FOR MAINTAINING FLAME STABILITY AND TEMPERATURE IN A CLAUS THERMAL REACTOR

BACKGROUND OF THE INVENTION

The subject matter disclosed herein relates to a system for maintaining flame stability and temperature in a Claus thermal reactor.

In general, integrated gasification combined cycle (IGCC) power plants are capable of generating energy from various hydrocarbon feedstock, such as coal, relatively cleanly and efficiently. IGCC technology may convert the hydrocarbon feedstock into a gas mixture of carbon monoxide (CO) and hydrogen ($H_2$), i.e., syngas, by reaction with oxygen and steam in a gasifier. These gases may be cleaned, processed, and utilized as fuel in a conventional combined cycle power plant. For example, the syngas may be fed into a combustor of a gas turbine of the IGCC power plant and ignited to power the gas turbine for use in the generation of electricity.

The cleaning and the processing of the syngas may include removal of impurities, such as sulfur and/or ammonia, from the syngas. The removal of these impurities may lead to cleaner burning fuel (i.e., fewer pollutants). However, challenges exist for the implementation of systems that may dispose of both sulfur and ammonia simultaneously, due to, for example, the differing combustion temperatures utilized to dispose of the sulfur and ammonia. Accordingly, cleaning processes and systems are desirable for the simultaneous removal of impurities, such as ammonia and sulfur, from generated syngas.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a sulfur recovery unit including an acid gas supply configured to supply acid gas, an oxygen supply configured to supply oxygen, a fuel supply configured to supply fuel, wherein the fuel has a higher heating value than the acid gas, and a thermal reaction zone configured to thermally recover sulfur from the acid gas by combustion of the fuel and the acid gas with the oxygen and reaction of the acid gas with combustion products arising from the combustion.

In a second embodiment, a system includes a sulfur recovery unit including an ammonia supply configured to supply ammonia, an acid gas supply configured to supply acid gas, an oxygen supply configured to supply oxygen, a fuel supply configured to supply fuel, and a thermal reaction zone comprising a first reaction zone configured to thermally recover sulfur from the acid gas by combustion of the acid gas with the oxygen and from reaction of the acid gas with products of the combustion, wherein the first reaction zone is configured to combust the fuel with a first portion of the acid gas and the oxygen prior to combustion with a second portion of the acid gas in a second reaction zone.

In a third embodiment, a system includes a fuel controller configured to vary an amount of fuel transmitted to a thermal reaction zone of a sulfur recovery unit to combust with an acid gas, ammonia, and oxygen in the thermal reaction zone of the sulfur recovery unit, wherein the amount of fuel is variable to maintain a combustion temperature of at least approximately 2300 degrees Fahrenheit in the thermal reaction zone for thermal removal of hydrogen sulfide in the acid gas and ammonia.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed below, the disclosed embodiments employ a high energy fuel (e.g., syngas) to improve flame stability of combustion of a low energy by-product gas in a cleaning system. The cleaning system may be configured to remove one or more products from the by-product gas via combustion within a suitable temperature range, yet the by-product gas may be incapable of burning at the suitable temperature range due to low energy, low heat output, or low concentration of certain portions of the by-product gas. For example, the suitable temperature range may have a lower temperature threshold and an upper temperature threshold for efficient removal of the products from the by-product gas. If the by-product gas does not combust with a stable flame (e.g., within the upper and lower temperature thresholds), then the disclosed embodiments may selectively add the high energy fuel to produce a stable flame. For example, the disclosed embodiments may be configured to mix the by-product gas with the high energy fuel to provide a suitable energy level, such that the mixture combusts with a stable flame to facilitate the removal of products from the by-product gas.

A heating value may be used to define energy characteristics of a fuel. For example, the heating value of a fuel may be defined as the amount of heat released by combusting a specified quantity of fuel. In particular, a lower heating value (LHV) may be defined as the amount of heat released by combusting a specified quantity (e.g., initially at 25° C. or another reference state) and returning the temperature of the combustion products to a target temperature (e.g., 150° C.). One example of LHV is British thermal unit (BTU) per standard cubic foot (scf), e.g., BTU/scf. A standard cubic foot (scf) may be defined as a measure of quantity of gas, equal to a cubic foot of volume at 60 degrees Fahrenheit and either 14.696 pounds per square inch (1 atm) or 14.73 PSI (30 in Hg) of pressure. By further example, a higher heating value (HHV) may be defined as the heat of condensation of water in the combustion products. LHV and/or BTU levels (e.g., low or high) may be used to indicate the heating value of various fuels, but it is not intended to be limiting in any way. Any other value may be used to characterize the energy and/or heat output of fuels within the scope of the disclosed embodiments. For example, hydrogen has a HHV of approximately 61,000 BTU/lb or 141.80 MJ/kg, and ammonia has a HHV of approximately 9,690 BTU/lb or 22.5 MJ/kg. Syngas may have a HHV of approximately 270 BTU/scf. Hydrogen sulfide ($H_2S$) may have a HHV of approximately 25 MJ/Nm$^3$. An acid gas includes some amount $H_2S$, and thus the HHV may vary depending on the concentration of $H_2S$. For example, as the concentration of $H_2S$ decreases, the acid gas would have a progressively lower energy value.

In certain embodiments, a high energy fuel (e.g., syngas) is used to stabilize a flame, and increase the heat of combustion, associated with a gas cleaning system. For example, the high energy fuel (e.g., syngas) may be selectively added to maintain flame stability and a suitable temperature in a Claus thermal reactor, particularly in situations with a low concentration of $H_2S$. The Claus thermal reactor may be, for example, a furnace for undertaking the thermal step in a Claus process (i.e., a desulfurizing process utilized to recover elemental sulfur from gaseous hydrogen sulfide). The Claus process may utilize a thermal recovery step and a catalytic recovery step in succession to strip elemental sulfur from a $H_2S$ gas stream, such as acid gas. Acid gas and ammonia may be provided to the thermal reactor (thermal reaction zone) that includes a furnace for combustion of the acid gas with oxygen and/or air. The acid gas combustion may occur at a temperature approximately 1800 to 2000 degrees Fahrenheit. However, in this temperature range, the ammonia provided to the thermal reactor may not be combusted, i.e. removed. The ammonia combustion may occur at a temperature of approximately 2300 to 2450 degrees Fahrenheit. Unfortunately, the part of acid gas and ammonia sent to the combustion zone might not be able to attain 2300 to 2450 degrees Fahrenheit due to low energy values, low heat output, or low concentration of certain portions (e.g., low concentration of $H_2S$) in the mixture. Accordingly, the disclosed embodiments selectively add a quantity of high energy fuel (e.g., syngas) to increase the energy value (e.g., HHV) of the mixture, thereby ensuring sufficient heat output and temperature levels to combust the $H_2S$ and the ammonia.

Figure 1:
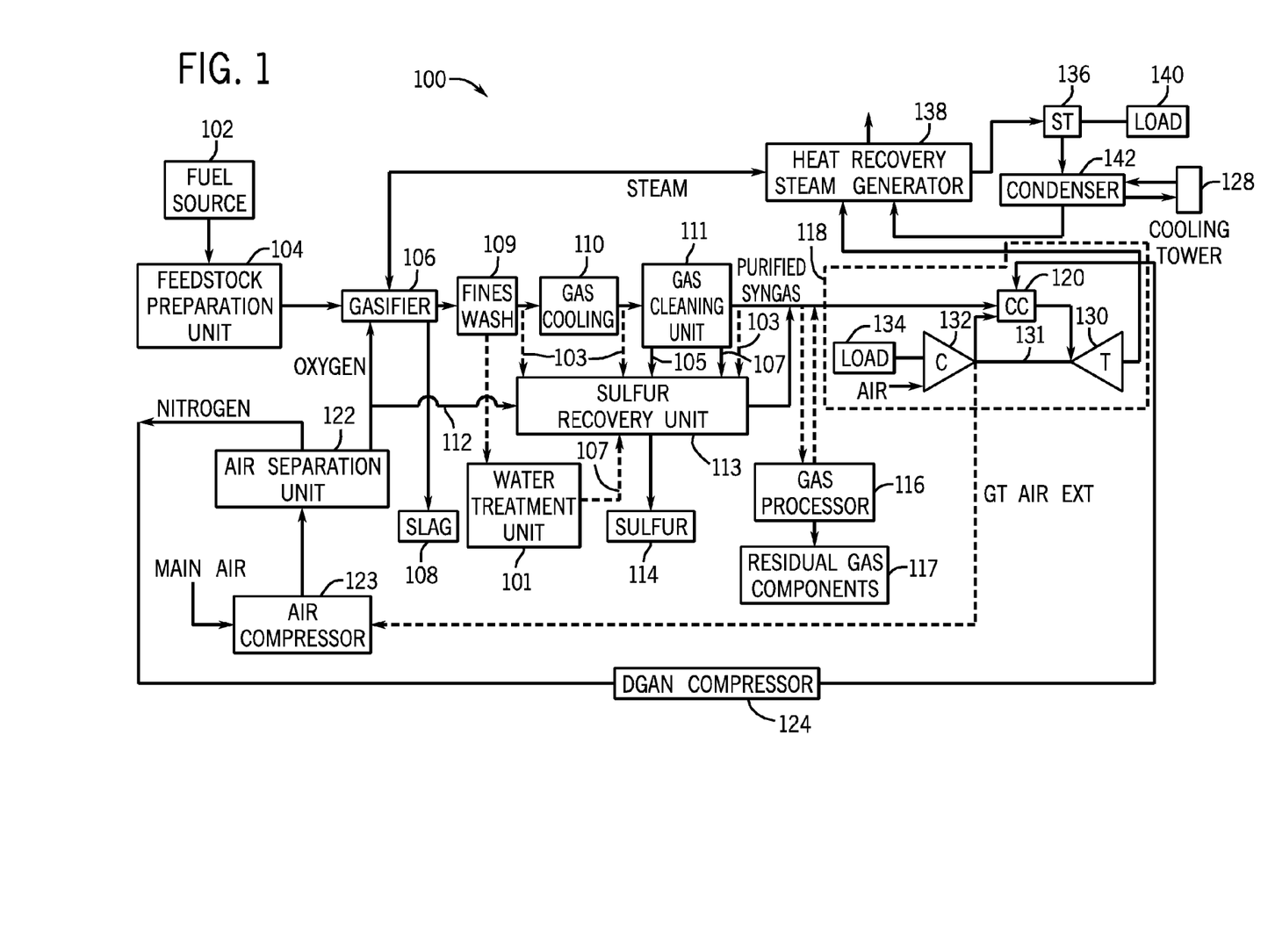
FIG. 1 is a schematic block diagram of an embodiment of an integrated gasification combined cycle (IGCC) power plant.

FIG. 1 is a diagram of an embodiment of an integrated gasification combined cycle (IGCC) system 100 that may be powered by synthetic gas, i.e., syngas. Elements of the IGCC system 100 may include a fuel source 102, such as a solid feed, that may be utilized as a source of energy for the IGCC. The fuel source 102 may include coal, petroleum coke, biomass, wood-based materials, agricultural wastes, tars, coke oven gas and asphalt, or other carbon containing items.

The solid fuel of the fuel source 102 may be passed to a feedstock preparation unit 104. The feedstock preparation unit 104 may, for example, resize or reshaped the fuel source 102 by chopping, milling, shredding, pulverizing, briquetting, or palletizing the fuel source 102 to generate feedstock. Additionally, water, or other suitable liquids may be added to the fuel source 102 in the feedstock preparation unit 104 to create slurry feedstock. In other embodiments, no liquid is added to the fuel source, thus yielding dry feedstock.

The feedstock may be passed to a gasifier 106 from the feedstock preparation unit 104. The gasifier 106 may convert the feedstock into a syngas, e.g., a combination of carbon monoxide and hydrogen. This conversion may be accomplished by subjecting the feedstock to a controlled amount of steam and oxygen at elevated pressures, e.g., from approximately 20 bar to 85 bar, and temperatures, e.g., approximately 700 degrees Celsius-1600 degrees Celsius, depending on the type of gasifier 106 utilized. The gasification process may include the feedstock undergoing a pyrolysis process, whereby the feedstock is heated. Temperatures inside the gasified 106 may range from approximately 150 degrees Celsius to 700 degrees Celsius during the pyrolysis process, depending on the fuel source 102 utilized to generate the feedstock. The heating of the feedstock during the pyrolysis process may generate a solid, (e.g., char), and residue gases, (e.g., carbon monoxide, hydrogen, and nitrogen). The char remaining from the feedstock from the pyrolysis process may only weigh up to approximately 30% of the weight of the original feedstock.

A particle combustion process may then occur in the gasifier 106. The combustion may include introducing oxygen to the char and residue gases. The char and residue gases may react with the oxygen to form carbon dioxide and carbon monoxide, which provides heat for the subsequent gasification reactions. The temperatures during the combustion process may range from approximately 700 degrees Celsius to 1600 degrees Celsius. Next, steam may be introduced into the gasifier 106 during a gasification step. The char may react with the carbon dioxide and steam to produce carbon monoxide and hydrogen at temperatures ranging from approximately 800 degrees Celsius to 1100 degrees Celsius. In essence, the gasifier utilizes steam and oxygen to allow some of the feedstock to be "burned" to produce carbon monoxide and energy, which drives a second reaction that converts further feedstock to hydrogen and additional carbon dioxide.

In this way, a resultant gas is manufactured by the gasifier 106. This resultant gas may include approximately 75 to 85% of carbon monoxide and hydrogen, as well as $CH_4$, HCl, HF, $NH_3$, HCN, and/or COS and $H_2S$ (based on the sulfur content of the feedstock). This resultant gas may be termed raw syngas. The gasifier 106 may also generate waste, such as slag 108, which may be a wet ash material. This slag 108 may be removed from the gasifier 106 and disposed of, for example, as road base or as another building material.

The raw syngas may still include particulate slag material. Accordingly, the raw syngas may be washed via, for example, a fines wash 109. The fines wash 109 may utilize filters and/or water, or other cleaning fluids, to wash and remove ash and slag 108 from the raw syngas. After being washed, the raw syngas may be cooled in a gas cooling unit 110. The gas cooling unit 110 may include one or more heat exchangers that operate to remove heat from the raw gas. This cooled raw syngas may be then transmitted to a gas cleaning unit 111 for cleaning. The gas cleaning unit 111 may scrub the raw syngas to remove the HCl, HF, COS, and HCN from the raw syngas. This scrubbing may also remove ammonia ($NH_3$) from the raw syngas as well as strip $H_2S$ from the raw syngas for subsequent processing. H$_2$S laden ammonia may also be obtained by stripping of wash water that was used to remove fines.

This processing of the H$_2$S may occur in a sulfur recovery unit 113, which may implement a process for recovery of elemental sulfur from gaseous hydrogen sulfide, as well as provide ammonia destruction during the process for recovery of elemental sulfur from gaseous hydrogen sulfide, as will be discussed in greater detail below with respect to FIGS. 2-4. As illustrated, the sulfur recovery unit 113 may receive syngas via one or more paths 103, as the syngas exits the fines wash 109, the gas cooling unit 110, and/or the gas cleaning unit 111. The sulfur recovery unit 113 may also receive a H$_2$S rich gas stream, referred to as acid gas, from the gas cleaning unit 111 along path 105 and an ammonia rich gas stream from the gas cleaning unit 111 along path 107 and/or from a water treatment unit 101 along path 107. Additionally, the sulfur recovery unit 113 may receive an oxygen rich gas stream (or air stream) along path 112. The sulfur recovery unit 113 may utilize these fluids transmitted via paths 103, 105, 107, and 112 to remove, for example, sulfur and ammonia from the syngas.

The gas exiting the gas cleaning unit may be, purified syngas, i.e. substantially lean of H$_2$S, but may include tail gases such as methane (CH$_4$). Accordingly, the gas stream exiting the gas cleaning unit 111 may be transmitted to a gas processor 116, which may be utilized to remove residual gas components 117 from the purified syngas such as, methane, as well as methanol or any residual chemicals. However, removal of residual gas components 117 from the purified syngas may be optional, since the purified syngas may be utilized as a fuel even when containing the residual gas components 117, e.g., tail gas. At this point, the purified syngas may include approximately 3% CO, approximately 55% H$_2$, and approximately 40% CO$_2$ and is substantially stripped of H$_2$S and ammonia. This purified syngas may be transmitted to a combustor 120, e.g., a combustion chamber, of a gas turbine engine 118 as combustible fuel.

The IGCC system 100 may further include an air separation unit (ASU) 122. The ASU 122 may operate to separate air into component gases by, for example, distillation techniques. The ASU 122 may separate oxygen from the air supplied to it from a supplemental air compressor 123, and the ASU 122 may transfer the separated oxygen to the gasifier 106. Additionally the ASU 122 may transmit separated nitrogen to a diluent nitrogen (DGAN) compressor 124.

The DGAN compressor 124 may compress the nitrogen received from the ASU 122 at least to pressure levels equal to those in the combustor 120, so as not to interfere with the proper combustion of the syngas. Thus, once the DGAN compressor 124 has adequately compressed the nitrogen to a proper level, the DGAN compressor 124 may transmit the compressed nitrogen to the combustor 120 of the gas turbine engine 118.

As described previously, the compressed nitrogen may be transmitted from the DGAN compressor 124 to the combustor 120 of the gas turbine engine 118. The gas turbine engine 118 may include a turbine 130, a drive shaft 131 and a compressor 132, as well as the combustor 120. The combustor 120 may receive fuel, such as syngas, which may be injected under pressure from fuel nozzles. This fuel may be mixed with compressed air as well as compressed nitrogen from the DGAN compressor 124, and combusted within combustor 120. This combustion may create hot pressurized exhaust gases.

The combustor 120 may direct the exhaust gases towards an exhaust outlet of the turbine 130. As the exhaust gases from the combustor 120 pass through the turbine 130, the exhaust gases may force turbine blades in the turbine 130 to rotate the drive shaft 131 along an axis of the gas turbine engine 118. As illustrated, the drive shaft 131 is connected to various components of the gas turbine engine 118, including the compressor 132.

The drive shaft 131 may connect the turbine 130 to the compressor 132 to form a rotor. The compressor 132 may include blades coupled to the drive shaft 131. Thus, rotation of turbine blades in the turbine 130 may cause the drive shaft 131 connecting the turbine 130 to the compressor 132 to rotate blades within the compressor 132. This rotation of blades in the compressor 132 causes the compressor 132 to compress air received via an air intake in the compressor 132. The compressed air may then be fed to the combustor 120 and mixed with fuel and compressed nitrogen to allow for higher efficiency combustion. Drive shaft 131 may also be connected to load 134, which may be a stationary load, such as an electrical generator for producing electrical power, for example, in a power plant. Indeed, load 134 may be any suitable device that is powered by the rotational output of the gas turbine engine 118.

The IGCC system 100 also may include a steam turbine engine 136 and a heat recovery steam generation (HRSG) system 138. The steam turbine engine 136 may drive a second load 140. The second load 140 may also be an electrical generator for generating electrical power. However, both the first and second loads 134, 140 may be other types of loads capable of being driven by the gas turbine engine 118 and steam turbine engine 136. In addition, although the gas turbine engine 118 and steam turbine engine 136 may drive separate loads 134 and 140, as shown in the illustrated embodiment, the gas turbine engine 118 and steam turbine engine 136 may also be utilized in tandem to drive a single load via a single shaft. The specific configuration of the steam turbine engine 136, as well as the gas turbine engine 118, may be implementation-specific and may include any combination of sections.

The system 100 may also include the HRSG 138. Heated exhaust gas from the gas turbine engine 118 may be transported into the HRSG 138 and used to heat water and produce steam used to power the steam turbine engine 136. Exhaust from, for example, a low-pressure section of the steam turbine engine 136 may be directed into a condenser 142. The condenser 142 may utilize a cooling tower 128 to exchange heated water for chilled water. The cooling tower 128 acts to provide cool water to the condenser 142 to aid in condensing the steam transmitted to the condenser 142 from the steam turbine engine 136. Condensate from the condenser 142 may, in turn, be directed into the HRSG 138. Again, exhaust from the gas turbine engine 118 may also be directed into the HRSG 138 to heat the water from the condenser 142 and produce steam.

In combined cycle systems such as IGCC system 100, hot exhaust may flow from the gas turbine engine 118 and pass to the HRSG 138, where it may be used to generate high-pressure, high-temperature steam. The steam produced by the HRSG 138 may then be passed through the steam turbine engine 136 for power generation. In addition, the produced steam may also be supplied to any other processes where steam may be used, such as to the gasifier 106. The gas turbine engine 118 generation cycle is often referred to as the "topping cycle," whereas the steam turbine engine 136 generation cycle is often referred to as the "bottoming cycle." By combining these two cycles as illustrated in FIG. 1, the IGCC system 100 may lead to greater efficiencies in both cycles. In particular, exhaust heat from the topping cycle may be captured and used to generate steam for use in the bottoming cycle.

Figure 2:
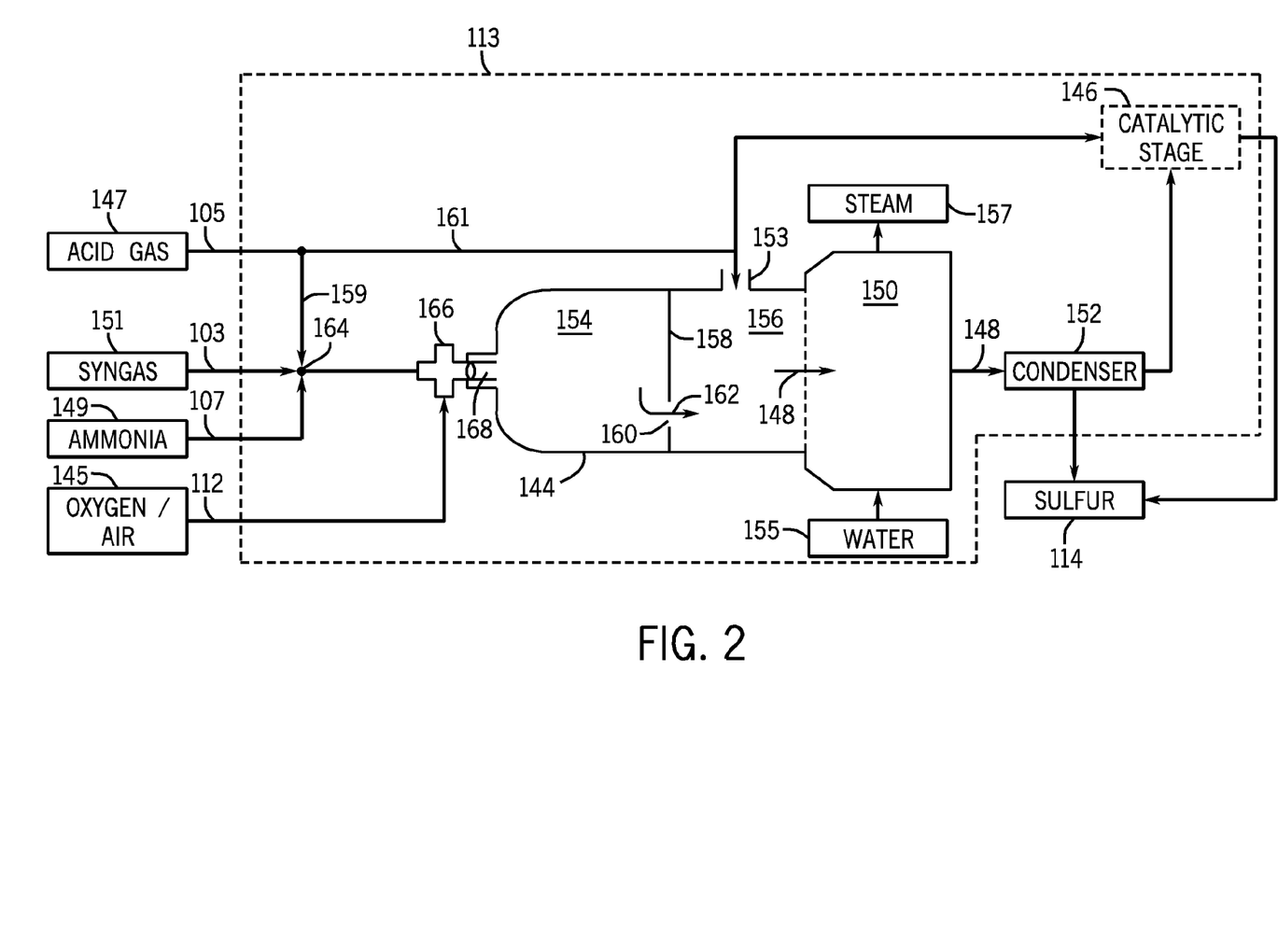
FIG. 2 is a schematic block diagram of a first embodiment of the sulfur recovery unit of the IGCC power plant of FIG. 1.

FIG. 2 illustrates an embodiment of the sulfur recovery unit (SRU) 113 utilizing a high energy fuel (e.g., syngas 151) to facilitate a Claus process with a low energy fuel (e.g., acid gas 147). As illustrated, the SRU 113 may receive an oxygen supply 145 along path from the air separation unit 122 and an acid gas supply 147 and an ammonia supply 149 from the gas cleaning unit 111 along paths 105 and 107 and/or from the water treatment unit 101, respectively. Additionally, the SRU 113 may receive a syngas supply 151 from the output of the fines wash 109, the gas cooling unit 110, and/or the gas cleaning unit 111 along path 103 (i.e., from one or more locations in the IGCC system 100). Additionally, other high heating value fuels may be used in place of syngas 151, such as natural gas, hydrogen, methane, or other combustible fuels. Syngas 151 may be used as the fuel, since syngas 151 may have a higher heating value, e.g., 270 BTU/scf, than that of the acid gas 147. This difference in heating value may be determinant on the type of fuel used and the difference in the heating value of the fuel relative to the acid gas 147 may be, for example, approximately 25%, 50%, 75%, 100%, 150%, 200%, or more.

The SRU 113 may utilize a Claus process to recover sulfur from the acid gas 147. This Claus process may include a thermal process and a catalytic process. The thermal process may be performed generally by, for example, a furnace 144 (a thermal reactor) while the catalytic process (catalytically recovering sulfur from the acid gas 147 by a catalytic reaction) may be performed by one or more catalytic stages 146 (catalytic reactors). Chemical reactions occurring in the furnace 144 may include generation of sulfur 114 via the following equation: $H_2S+\frac{1}{2}O_2 \rightarrow H_2O+S$. Additionally, sulfur dioxide may be generated in the thermal process in the furnace 144 via the following equation: $H_2S+\frac{3}{2}O_2 \rightarrow H_2O+SO_2$. Sulfur 114 may also be generated in the thermal and one or more catalytic stages from, for example, the sulfur dioxide produced in the furnace 144 via the equation: $2H_2S+SO_2 \rightarrow 2H_2O+(3/x)S$. In operation, the furnace 144 may receive a gas stream (acid gas 147) containing hydrogen sulfide ($H_2S$), which may be burned with an oxidant (oxygen and/or air 145) to generate combustion gases that contain free sulfur 114 and sulfur dioxide, as set forth above. These gases 148 may enter a boiler 150, which may operate as a heat exchanger cooling the gases 148 by transferring heat to water 155 to produce steam 157. The gases 148, which contain free sulfur 114 and sulfur dioxide, may be transmitted to another heat exchanger, which may be a condenser 152. The condenser 152 may be a heat exchanger that condenses sulfur from the gases 148 through cooling of the gases 148 via, for example, a coolant. That is, the condenser 152 may cool the gases 148 to condense the free sulfur 114 into, for example, solid form to be removed from the SRU 113. The remaining gas may be transmitted to the catalytic stage 146 for further processing of, for example, sulfur dioxide and hydrogen sulfide in the remaining gas.

Typically, at least ⅓ of the total volume of acid gas 147 may be transmitted to a first stage 154 of the furnace 144 (i.e. a first thermal reaction zone) via path 159, while the remaining approximately ⅔ by volume of the acid gas 147 may be transmitted along path 161 to a second stage 156 of the furnace 144 (i.e. a second thermal reaction zone) via an opening 153 in the furnace 144. The first and second stages 154 and 156 of the furnace 144 may be separate zones, which are separated via a divider 158. Furthermore, the divider 158 may include an opening 160 that allows for the flow of a gas stream 162 from the first zone 154 to the second zone 156. Division of the acid gas 147 in this manner may allow for proper, and controlled, combustion of the $H_2S$ in the acid gas 147 across the entirety of the furnace 144, and may allow for flame stability in the first and second stages 154 and 156 such that sulfur may be thermally recovered in each of the first and second stages 154 and 156 of the respective acid gas 147 streams received along paths 159 and 161 oxygen. $H_2S$ may also be recovered in either or both of the first and second stages 154 and 156 through reaction of the acid gas with combustion products arising from the combustion described above.

The $H_2S$ in the acid gas 147 properly combusts at a temperature of at least greater than or equal to 1800 to 2000 degrees Fahrenheit. Thus, the disclosed embodiments maintain a stable flame in the zones 154 and 156 to provide a temperature of at least greater than or equal to approximately 1800 degrees Fahrenheit. At this temperature, the Claus process enables the separation of sulfur 114 from the acid gas 147.

However, the illustrated SRU 113 also receives ammonia 149. Combustion of ammonia 149 may occur at higher temperatures, such as between approximately 2300 to 2400 degrees Fahrenheit. Thus the temperature of the combustion occurring in the furnace 144 may be raised to combust both ammonia 149 and the $H_2S$ in the acid gas 147. In one embodiment, syngas 151 may be added to the gases to be combusted in the furnace 144 (e.g., ammonia 149, acid gas 147, and oxygen and/or air 145) to raise the overall combustion temperature of the furnace 144 to approximately at least greater than approximately 2300, 2400, or 2500 degrees Fahrenheit, so that the ammonia 149 may be fully combusted during the Claus processing of the $H_2S$ in the acid gas 147.

The syngas 151 utilized to aid in raising the combustion temperature of the furnace 144 may be received from, for example but not limited to, the output of the gas cleaning unit 111. The syngas may, for example, be preheated to a temperature of at least approximately 500, 550, or 600 degrees Fahrenheit. The syngas 151 to be combusted may, for example but not limited to, be approximately less than 5% by volume of the total amount of syngas 151 exiting the gas cleaning unit 111. Because syngas 151 has a higher heating value than the other gases present (the oxygen and/or air 145, the acid gas 147, and the ammonia 149) inclusion of the syngas 151 may be useful in stabilizing the flame used in the combustion step of the Claus process. That is, a low content $H_2S$ acid gas 147 (less than approximately 25%, 20%, 15%, or 10% $H_2S$ by volume in the acid gas 147) may generate insufficient heat as a fuel in the furnace 144 to combust the $H_2S$ and/or the ammonia 149. Accordingly, syngas 151 may be mixed with the acid gas 147 and with the ammonia 149 at a junction point 164 to aid in proper flame stability during the combustion portion of the Claus process. The mixed syngas 151, acid gas 147, and ammonia 149 may be routed to, for example, a multi-way valve 166 in the inlet 168 of the furnace 144. The junction 164 may include a premixing chamber that includes an outlet coupled to the first reaction zone 154 via the multi-way valve. Additionally, the oxygen and/or air 145 may be routed to the inlet 166 for transmission into the furnace. In this manner, oxygen and/or air 145, acid gas 147, ammonia 149, and syngas 151 may be transmitted to the furnace 144 for combustion, resulting in elimination of the ammonia 149 present, as well as processing of the $H_2S$ in the acid gas 147 via the Claus process detailed above.

Figure 3:
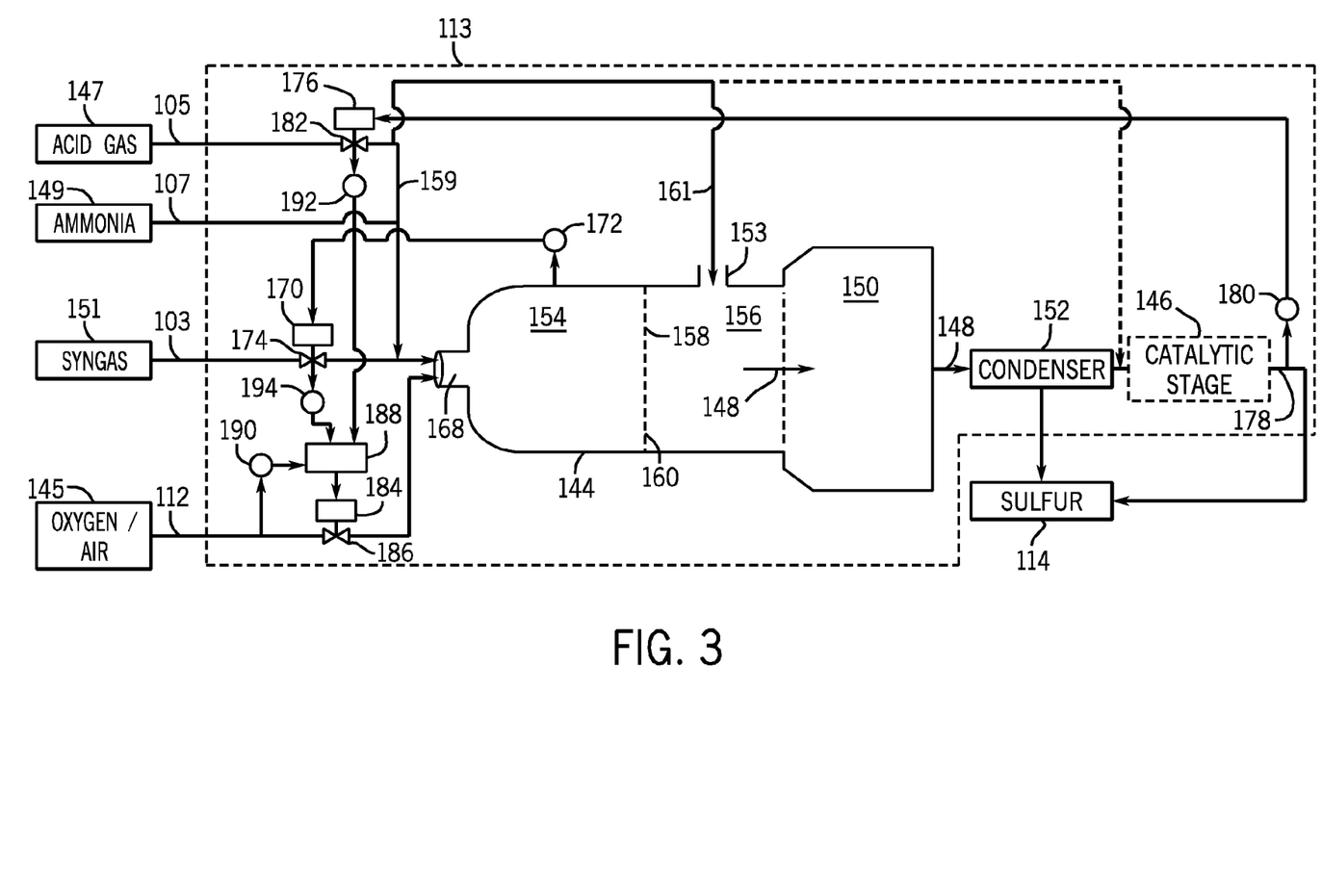
FIG. 3 is a schematic block diagram of a second embodiment of the sulfur recovery unit of the IGCC power plant of FIG. 1.

FIG. 3 illustrates a more detailed embodiment of the SRU 113 described above. The SRU 113 may receive an acid gas supply 147 containing $H_2S$, an ammonia supply 149, a syngas supply 151, and an oxygen or air supply 145 for use in both processing sulfur 114 via a Claus process and for eliminating ammonia 149. As described above, the furnace 144 may combust the aforementioned fluids at a temperature of least at approximately 2300 to 2450 degrees Fahrenheit, so that the ammonia 149 may be fully removed during the Claus processing of the $H_2S$ in the acid gas 147. The illustrated embodiment includes a system of sensors, valves, and controllers, which may control the flow and proportion of acid gas 147 containing $H_2S$, ammonia 149, syngas 151, and oxygen or air 145 for proper combustion of both the ammonia 149 and the $H_2S$.

The syngas flow to the first zone 154 may be varied with respect to temperature. The syngas controller 170 may receive temperature readings from a temperature sensor 172 positioned to measure the temperature in one or more of the zones 154 and 156 of the furnace 144. The syngas controller 170 may receive signals indicative of the temperature of the furnace 144, and may adjust the opening of a syngas valve 174 accordingly. For example, if the temperature in the furnace 144 is measured by the temperature sensor 172 to be below a lower temperature threshold (e.g., 2300 degrees Fahrenheit) for combustion of the ammonia 149 and $H_2S$, then the syngas controller 170 may transmit a signal to the syngas valve 174 causing the syngas valve 174 to open to allow more syngas 151 to pass to the furnace 144. This will result in a hotter combustion, (e.g., greater energy release due to added syngas 151), causing the combustion temperature in the furnace 144 to rise. Conversely, if the temperature in the furnace 144 is above an upper temperature threshold (e.g., 2300 degrees Fahrenheit), then the syngas controller 170 may transmit a signal to the syngas valve 174 causing the syngas valve 174 to close to allow less syngas 151 to pass to the furnace 144. This will result in a cooler combustion, (e.g., greater energy release due to added syngas 151) causing the combustion temperature in the furnace 144 to fall. In this manner, the combustion temperature of the furnace 144 may be monitored and adjusted to insure proper removal of both ammonia 149 and $H_2S$ from the input gas stream to the furnace 144.

Similarly, the amount of acid gas 147 transmitted into the furnace 144 may be controlled via, for example, an acid gas controller 176. The acid gas controller 176 may receive information related to a ratio of hydrogen sulfide to sulfur dioxide in the exhaust 178 of the catalytic stage 146. A sensor 180 may take measurements relating to an exhaust 178 characteristic of the catalytic stage 146 (e.g. the catalytic reaction zone of the sulfur recovery unit 113), such as the ratio of hydrogen sulfide to sulfur dioxide in the exhaust 178 of the catalytic stage 146 and may transmit signals corresponding to those readings to the acid gas controller 176. In one embodiment, a ratio of approximately 2:1 of hydrogen sulfide to sulfur dioxide is desirable. Accordingly, the acid gas controller 176 may adjust the opening of an acid gas valve 182 accordingly. For example, if the ratio of hydrogen sulfide to sulfur dioxide in the exhaust 178 of the catalytic stage 146 is above an upper threshold, the acid gas controller 176 may transmit a signal to the acid gas valve 182 causing the acid gas valve 182 to close to to allow less acid gas 147 to pass to the furnace 144. Conversely, if the ratio of hydrogen sulfide to sulfur dioxide in the exhaust 178 of the catalytic stage 146 is below a lower threshold, the acid gas controller 176 may transmit a signal to the acid gas valve 182 causing the acid gas valve 182 to open to allow more acid gas 147 to pass to the furnace 144. In this manner, the ratio of hydrogen sulfide to sulfur dioxide in the exhaust 178 of the catalytic stage 146 may be monitored and adjusted to insure proper exhaust levels that meet with, for example, pollution regulations.

Additionally, the amount of oxygen and/or air 145 transmitted into the furnace 144 may be controlled via, for example, an oxygen controller 184. The oxygen controller 184 may adjust the opening and closing of an oxygen valve 186 to control the amount of oxygen available for the combustion process in the furnace 144. The operation of the oxygen controller 184 may be controlled via a gas to oxygen controller 188. The gas to oxygen controller 188 may receive measurements from an oxygen flow sensor 190, an acid gas flow sensor 192, and a syngas flow sensor 194, which respectively measure the flow of oxygen, acid gas, and syngas into the furnace 144. The gas to oxygen controller 188 may receive these measurements and may determine the appropriate amount of oxygen to completely combust, for example, the acid gas 147 being transmitted to the furnace 144. The gas to oxygen controller 188 may also insure that adequate oxygen 145 is transmitted to the furnace 144 to allow for combustion of the syngas 151, so that the combustion temperature of the furnace 144 may be maintained at a level allowing for combustion (i.e., removal) of the ammonia 149 transmitted to the furnace 144. In this manner, the gas to oxygen controller 188 may proactively receive measurements relating to the amounts of gas transmitted to the furnace 144 and may cause the oxygen controller 184 to adjust the flow of oxygen 145 (via the oxygen valve 186) to insure proper combustion of the acid gas 147, ammonia 149, and syngas 151 in the furnace 144.

Figure 4:
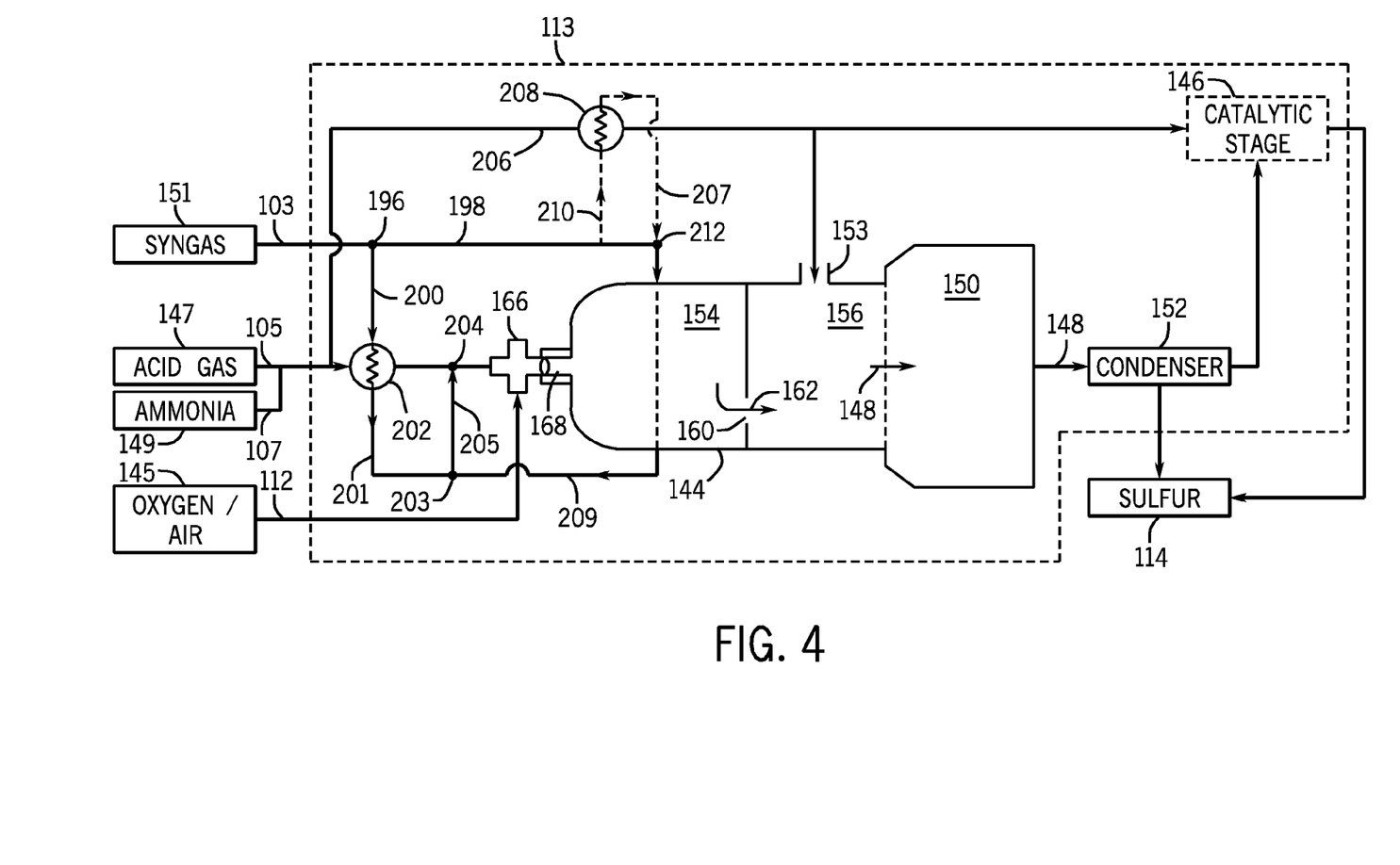
FIG. 4 is a schematic block diagram of a third embodiment of the sulfur recovery unit of the IGCC power plant of FIG. 1.

FIG. 4 illustrates another embodiment of the SRU 113 described above. The SRU 113 may receive an acid gas supply 147 containing $H_2S$, an ammonia supply 149, a syngas supply 151, and an oxygen or air supply 145 for use in both processing sulfur 114 via a Claus process and for simultaneously eliminating ammonia 149. As described above, the furnace 144 may combust the aforementioned fluids at a temperature of at least approximately 2300 degrees Fahrenheit, so that the ammonia 149 may be fully combusted during the Claus processing of the $H_2S$ in the acid gas 147. To aid in maintaining the proper combustion temperature, and to speed up the time in which it takes the furnace 144 to achieve a desired combustion temperature, the syngas 151 may be utilized to preheat the acid gas 147 and/or the furnace 144.

As illustrated, the syngas 151 may travel along path 103. A break at junction 196 may allow for volumes of the syngas 151 to proceed along paths 198 and 200. In one embodiment, the syngas 151 may be split in a ratio by volume of approximately 1:1, 1.5:1, 2:1, 3:1, 4:1, 5:1, 10:1, 20:1 or another ratio of syngas 151 sent along path 198 in relation to syngas 151 sent along path 200. The syngas 151 in paths 198 and 200 may be at a temperature of between approximately 400 to 500 degrees Fahrenheit. In one embodiment, the syngas 151 may be utilized to preheat the acid gas 147 prior to it being received by the furnace 144. This preheating may take place in a heat exchanger 202. The syngas 151 in path 200 may enter the heat exchanger 202 and may pass over path 105 carrying the acid gas 147. As the syngas 151 along path 200 passes through the heat exchanger 202 in path 105 of the acid gas 147, the syngas 151 transfers heat to the acid gas 147 to raise the temperature of the acid gas 147. After exiting the heat exchanger 202, the syngas 151 may follow a path 201 to junction 203 and onto path 205 so that the syngas 151 may mix with the acid gas 147 at junction 204.

Similarly, the syngas 151 in path 198 may be utilized to preheat the acid gas 147 along path 206 via heat exchanger 208. The syngas 151 may be diverted from path 198 via path 210, so as to enter the heat exchanger 208, thereby passing over path 206 carrying the acid gas 147. As the syngas 151 along path 198 passes through the heat exchanger 208 in path 206 of the acid gas 147, the syngas 151 transfers heat to the acid gas 147 to raise the temperature of the acid gas 147. After exiting the heat exchanger 208, the syngas 151 may follow a path 207 to junction 212, for use in pre-heating the furnace 144, as described below.

Alternatively and/or additionally, the syngas 151 along path 198 and/or from junction 212 may be utilized to preheat the furnace 144. In one embodiment, the syngas 151 may pass across the outside surface of the furnace 144 via, for example, heat exchange tubes or a double wall enclosure utilized to conduct the syngas 151 across the exterior of the furnace 144. In this manner, contact between the syngas 151 and the furnace 144 may operate to transfer heat to the furnace 144, causing combustion zone 154 and/or 156 therein to be heated. The syngas 151 may then flow away from the furnace 144 along a path 209, which routes the syngas 151 to junction 203 to mix with syngas 151 in path 201 for transmission to junction 204 along path 205 and mixture with the acid gas 147 along path 105. In this manner, the acid gas 147 and/or the furnace 144 may be preheated such that the less syngas 151 may be used to bring the furnace 144 combustion to a temperature level of approximately at least 2300 degrees Fahrenheit for combustion of ammonia 149 and $H_2S$.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
    a sulfur recovery unit, comprising:
        an acid gas supply configured to supply acid gas;
        an oxygen supply configured to supply oxygen;
        a fuel supply configured to supply fuel, wherein the fuel has a higher heating value than the acid gas;
        an ammonia supply configured to supply ammonia, wherein each of the ammonia supply, the acid gas supply, the oxygen supply, and the fuel supply are distinct from one another; and
        a thermal reaction zone configured to thermally recover sulfur from the acid gas by combustion of the fuel, the ammonia, and the acid gas with the oxygen and reaction of the acid gas with combustion products arising from the combustion.

2. The system of claim 1, wherein the sulfur recovery unit comprises a catalytic reaction zone configured to catalytically recover sulfur from the acid gas by a catalytic reaction.

3. The system of claim 1, wherein a first portion of acid gas is routed to the first reaction zone of the thermal reaction zone and a second portion of the acid gas is routed to a second reaction zone of the thermal reaction zone, and the first portion is one third by volume of the acid gas.

4. The system of claim 1, comprising a premixing chamber coupled to the acid gas supply and the fuel supply, wherein the premixing chamber comprises an outlet coupled to the first reaction zone.

5. The system of claim 1, comprising a premixing chamber coupled to the acid gas supply, the fuel supply, and the ammonia supply, wherein the premixing chamber comprises an outlet coupled to the first reaction zone.

6. The system of claim 1, wherein the sulfur recovery unit receives the fuel in an amount sufficient to maintain a stable flame and a temperature of at least approximately 2300 degrees Fahrenheit in the first reaction zone.

7. The system of claim 1, wherein the fuel comprises syngas preheated to a temperature of at least approximately 550 degrees Fahrenheit.

8. The system of claim 1, wherein the fuel comprises a raw syngas or a purified syngas, and the fuel supply is configured to couple to one or more locations in an integrated gasification combined cycle (IGCC) system including a gas turbine engine.

9. A system, comprising:
    a sulfur recovery unit, comprising:
        an ammonia supply configured to supply ammonia;
        an acid gas supply configured to supply acid gas;
        an oxygen supply configured to supply oxygen;
        a fuel supply configured to supply fuel, wherein each of the ammonia supply, the acid gas supply, the oxygen supply, and the fuel supply are distinct from one another; and
        a thermal reaction zone comprising a first reaction zone configured to thermally recover sulfur from the acid gas by combustion of the acid gas with the oxygen and from reaction of the acid gas with products of the combustion, wherein the first reaction zone is configured to combust the fuel with a first portion of the acid gas and the oxygen prior to combustion with a second portion of the acid gas in a second reaction zone.

10. The system of claim 9, wherein the sulfur recovery unit comprises a catalytic reaction zone configured to catalytically recover sulfur from the acid gas by a catalytic reaction.

11. The system of claim 9, wherein the second reaction zone is configured to thermally recover sulfur from the second portion of the acid gas by a reaction of the second portion of the acid gas with the with products of the combustion.

12. The system of claim 11, comprising a premixing chamber coupled to the acid gas supply and the fuel supply, wherein the premixing chamber comprises an outlet coupled to the first reaction zone.

13. The system of claim 9, wherein the first reaction zone is configured to combust the fuel, the first portion of the acid gas, and the ammonia with the oxygen.

14. The system of claim 9, wherein the sulfur recovery unit receives the fuel in an amount sufficient to maintain a stable flame and a temperature of at least approximately 2300 to 2450 degrees Fahrenheit in the first reaction zone.

15. The system of claim 9, wherein the fuel comprises a raw syngas or a purified syngas, and the fuel supply is configured to couple to one or more locations in an integrated gasification combined cycle (IGCC) system.

16. The system of claim 9, wherein the first portion of the acid gas is one third by volume of the acid gas.

* * * * *